(12) United States Patent
Fehn

(10) Patent No.: US 9,768,648 B2
(45) Date of Patent: Sep. 19, 2017

(54) ROTOR FOR ELECTRIC MACHINE

(71) Applicant: Wittenstein AG, Igersheim (DE)

(72) Inventor: Daniel Fehn, Kups (DE)

(73) Assignee: Wittenstein SE, Igersheim (DE)

( * ) Notice: Subject to any disclaimer, the term of this patent is extended or adjusted under 35 U.S.C. 154(b) by 642 days.

(21) Appl. No.: 14/189,464

(22) Filed: Feb. 25, 2014

(65) Prior Publication Data

US 2014/0239749 A1    Aug. 28, 2014

(30) Foreign Application Priority Data

Feb. 27, 2013   (DE) .................. 10 2013 101 956

(51) Int. Cl.
| | |
|---|---|
| H02K 1/04 | (2006.01) |
| H02K 21/12 | (2006.01) |
| H02K 1/27 | (2006.01) |
| H02K 15/03 | (2006.01) |
| H02K 1/30 | (2006.01) |

(52) U.S. Cl.
CPC .............. *H02K 1/04* (2013.01); *H02K 1/274* (2013.01); *H02K 1/278* (2013.01); *H02K 1/30* (2013.01); *H02K 15/03* (2013.01); *Y10T 29/49012* (2015.01)

(58) Field of Classification Search
CPC .................... H02K 1/27; H02K 15/03
USPC ...... 310/43, 156.01, 156.19, 156.29, 156.31, 310/156.61, 216.116, 216.121, 156.21, 310/156.22
See application file for complete search history.

(56) References Cited

U.S. PATENT DOCUMENTS

| | | | |
|---|---|---|---|
| 4,594,525 A * | 6/1986 | Stokes ................. | H02K 1/278 310/156.13 |
| 7,545,067 B2 | 6/2009 | Drexlmaier | |
| 2007/0210663 A1* | 9/2007 | Kalavsky ............. | H02K 1/278 310/156.19 |
| 2008/0093945 A1* | 4/2008 | Gruenhagen ......... | H02K 1/278 310/156.19 |

FOREIGN PATENT DOCUMENTS

| | | |
|---|---|---|
| DE | 2845702 A1 | 4/1980 |
| EP | 1748533 B1 | 9/2010 |
| JP | 2004336965 A * | 11/2004 |

* cited by examiner

*Primary Examiner* — Jose Gonzalez Quinones
(74) *Attorney, Agent, or Firm* — Bachman & LaPointe, PC

(57) ABSTRACT

Rotor, in particular permanent magnet rotor, for an electric machine, having a magnet support, a plurality of magnets which are arranged on the magnet support, and a rotor core which is arranged between a shaft and the magnet support, wherein the rotor core comprises plastic.

14 Claims, 4 Drawing Sheets

ROTOR FOR ELECTRIC MACHINE

BACKGROUND OF THE INVENTION

The invention relates to a rotor for an electric machine and to a production method for a rotor.

Permanent magnet rotors for electric machines, which permanent magnet rotors have a rotor with individual permanent magnets, are known from the prior art.

EP 1 748 533 B1 discloses a permanent magnet rotor, in which there is a ground ring on a shaft for closing the magnetic circuit which runs through the permanent magnets. In the arrangement of EP 1 748 533 B1, the permanent magnets are pushed axially into a prefabricated plastic cage. It might be considered disadvantageous in the construction of EP 1 748 533 B1 that a very large shaft diameter is necessary, in order to accommodate the individual parts of the permanent magnet rotor. Furthermore, it might be considered disadvantageous that pushing the magnets in axially is impractical in some circumstances, or that in general the necessity of a plastic cage which is to be prefabricated is impractical.

It is an object to improve or to optimize rotors, in particular permanent magnet rotors, which are known from the prior art. In general, simpler production or greater performance or greater practicality or lower production costs are desirable here. In addition, further targets for improvement can exist.

SUMMARY OF THE INVENTION

The foregoing objects of the present invention are obtained by the rotor of the invention as described below.

A first aspect relates to a rotor, in particular a permanent magnet rotor, for an electric machine, having a magnet support, a plurality of magnets which are arranged on the magnet support, and a rotor core which is arranged between a shaft and the magnet support, the rotor core comprising plastic.

A second aspect relates to a production method for a rotor in a typical embodiment, the plastic being injection-molded or cast.

Typical embodiments comprise a magnet support which is usually composed of a magnetically conducting material or at least comprises magnetically conducting material, in particular magnetic steel plate or steel; examples have the designations M270-35A or NO20. A plurality of magnets are arranged on the magnet support. The magnet support mentioned herein typically has the function of ensuring an optimum magnetic flux and at the same time of having as low a weight as possible. The term magnetic flux plate can also be used instead of the magnet support in embodiments. The optimum magnetic flux represents a magnetic flux in a solid shaft made from conductive material. A holding function for the magnets is not necessarily accorded to the magnet support. A holding function of this type can also be assumed by other components of a rotor. Permanent magnets are typically arranged on the magnet support. Permanent magnets afford the advantage that they do not require any current feed. In further embodiments, electromagnetic magnets are arranged additionally or exclusively. The magnets are preferably arranged individually on the magnet support. In typical embodiments, at least four or at least six or at least eight individual magnets are arranged on the magnet support. The arrangement of individual magnets affords the advantage of improved force delivery in comparison with a completely circumferential magnet. The individual magnets are typically arranged spaced apart from one another on the magnet support. Shaped-out moldings can be provided on the magnet support between the magnets. In this way, a sequence of magnet, shaped-out moldings, magnet, shaped-out molding, etc. is achieved in the circumferential direction.

The individual magnets can be held in their position by way of an arrangement of this type. The shaped-out moldings are typically configured in one piece with the magnet support. The term in one piece usually also includes welding of the shaped-out moldings or soldering or some other connection which leads to an integral component. The shaped-out moldings are typically likewise made from a magnetically conducting material. The magnets are typically oriented axially. This usually means that they have a longitudinal extent in a certain direction, said longitudinal extent being oriented in the axial direction. Here, the axial direction denotes the direction, in which a rotational axis of the rotor runs. Plastic is arranged between the individual magnets in typical embodiments. In embodiments with shaped-out moldings, the plastic typically encloses the shaped-out moldings. The plastic which is arranged between the magnets forms a filling made from plastic. The filling made from plastic makes positively locking fixing of the magnets on the magnet support possible.

The magnets are typically tapered radially to the outside in the radial direction. Typical embodiments of magnets have side faces which delimit the magnets in the circumferential direction, said side faces having an inclination with respect to the radial direction of at least 10°, at least 20° or at least 30°. The radial direction relates to the axis of the rotor. The inclination is typically such that the magnets are wider at their base, that is to say radially on the inside, than at the outer end, that is to say radially on the outside. By way of a shape of this type, the magnets typically have a trapezoidal cross section, optionally with one or more curved boundary faces. In this way, fixing of the magnets can be achieved reliably by way of the plastic.

The magnets are typically oriented in the direction of the axis of the rotor. The magnets are typically arranged in each case between shaped-out moldings of the magnet support. Typical shaped-out moldings comprise pins or square bolts or elongate shaped-out moldings which extend in the longitudinal direction, that is to say in the axial direction, of the rotor. The elongate shaped-out moldings can be of interrupted or continuous configuration. The shaped-out moldings are undercut in typical embodiments. Further embodiments have shaped-out moldings without undercut regions. In typical embodiments, the shaped-out moldings are undercut at least partially. An undercut is typically arranged on one side or on both sides of the shaped-out molding. Typical shaped-out moldings have a dovetail shape. A dovetail shape affords the advantage of simple construction and reliable fixing. Typical shaped-out moldings are configured in the longitudinal direction of the rotor as a strip with a dovetail-shaped cross section. In further exemplary embodiments, the shaped-out moldings are mushroom-shaped or knob-shaped.

In typical embodiments, the peripheral surface of the magnets is free of plastic at least partially. An arrangement of this type affords the advantage that the spacing between the magnet of the rotor and a stator can be minimized.

Typical embodiments comprise a rotor core which is arranged between a shaft and the magnet support and comprises plastic. In typical exemplary embodiments, the rotor core is configured completely from plastic. The rotor core usually has a thickness in the radial direction of at least 10% of the radius of the rotor. Here, the radius of the rotor typically corresponds to the spacing between the rotational axis of the rotor and an outer face of at least one of the magnets which are arranged on the magnet support or the outer face of a filling made from plastic which is arranged between the magnets. In the exemplary embodiments, the thickness of the rotor core in the radial direction is at least 20%, at least 30% or at least 40% of the radius of the rotor. Additional advantages can be achieved with a thickness in the radial direction of at least 45%, at least 50% or at least 55%. In the case of a large thickness of the rotor core, the rotor becomes particularly light in comparison with a completely solid embodiment. It is to be taken into consideration here that rotating mass is saved by way of the rotor core. The mass moment of inertia is therefore reduced. The rotor core is typically of completely circumferential configuration. In further embodiments, the rotor core is of interrupted configuration.

Typical embodiments of the rotor core comprise radial spokes. A rotor core having spokes affords the advantage of a great weight saving. Further embodiments comprise a rotor core made from solid material. A rotor core made from solid material is particularly stable. In typical embodiments, profilings, for example elevations or recesses, can be provided on at least one of the circumferential faces in a rotor core, for example a rotor core made from solid material or a rotor core having radial spokes. Here, the circumferential faces mean, in particular, one of the two curved boundary faces, for example the radially inner circumferential face or the radially outer circumferential face. Elevations or recesses on at least one of the circumferential faces afford the advantage of a reliable torque transmission between, for example, a shaft and the rotor core or the rotor core and a magnet support. In embodiments, additional parts can be arranged between the rotor core and the magnet support, for example an outer ring for the rotor core made from a metal or a duroplastic, in order to enclose the rotor core. In further embodiments, a ring or another part can be provided on the inner side of the rotor core. A ring of this type or a part of this type on the inner side of the rotor core can be used for fastening on a shaft, metal, duroplastic or another plastic being suitable as materials.

Embodiments of the rotor core comprise openings. In particular, embodiments comprise axially oriented openings. Here, axially oriented means that the openings have at least one directional component in the direction of the rotational axis of the rotor. Openings of this type can be configured as through openings. Through openings are openings which typically reach completely through the rotor core in the axial direction. In further embodiments, blind holes are provided which can be provided in the axial direction or else in the radial direction. Openings of this type afford advantages with regard to an oscillation damping or weight saving.

In typical embodiments of the rotor, the shaft can be configured as a bush which is later pulled onto a motor shaft. In further embodiments, the shaft is configured as a solid shaft or as a hollow shaft.

In comparison with ring magnets, the individual magnets of the rotor afford the advantage that there is low sensitivity to temperature changes. The magnet support affords the advantage that the magnetic flux of the rotor is not impaired by the rotor core made from plastic. The magnet support typically has a thickness which is at least 5%, at least 10% or at least 15% of the radius of the rotor.

Typical configurations of the rotor core have a rib structure. Typical ribs can be configured in the axial direction or in the radial direction. Ribs afford the advantage that high weight saving and satisfactory damping are achieved. In the context of ribs, spokes can also be provided in the radial direction. In further embodiments, at least one intermediate plane which can typically be closed or can be provided with openings is provided in the radial direction. A closed version has a higher rigidity, and an open version has a lower weight. An intermediate plane of this type is typically cylindrical. During production of the rotor core, the rotor core can be injection-molded or cast around the shaft or the bush. In further embodiments, a shaft or a bush is inserted subsequently into the rotor core.

There is typically a non-positive connection between a shaft or a bush on one side and the rotor core on the other side. A non-positive connection of this type can be produced by injection-molded encapsulation. A further possibility is production by means of a press-fit connection, a longitudinal press-fit connection or transverse press-fit connection typically being used. A transverse press-fit connection is typically produced by a change in temperature, and a longitudinal press-fit connection is typically produced by pressing the shaft or bush into the rotor core. In further embodiments, there is a positively locking connection between the shaft or the bush on one side and in the rotor core made from plastic on the other side.

The rotor core typically has an unbalance. In typical embodiments, there is an unbalance of the rotor core with regard to the rotational axis of the rotor. Compensation of the mass distribution of the rotor can take place in this way. In typical embodiments, the rotor is balanced. An unbalance of the rotor core can be used for balancing of this type. In typical embodiments, negative balancing of the rotor is performed, material being removed. In typical embodiments, positive balancing is performed. One example for positive balancing is the attachment of weights to the rotor, in particular to the rotor core. One possibility is filling openings or cavities or spoke intermediate spaces or generally intermediate spaces of the rotor core with a filling material. Typical filling materials comprise a cast epoxy resin or two-component injection-molding compound or metal. Cast filling materials, such as epoxy resin or two-component injection-molding compound, additionally afford the option of performing a removal of the filling material, in order to achieve negative balancing or balancing of the rotor. Typical removal processes for removing the filling material comprise material-removing processes, such as drilling, grinding, punching or milling. A further option is eroding processes. In typical embodiments, openings are provided in the filling material, for example axial or radial bores or punched-out portions. Typical embodiments comprise a rotor core with an axially protruding ring. Typical embodiments comprise radial or axial bores in the protruding ring. In typical embodiments, the ring is configured in one piece with the rotor core. In further embodiments, the ring is adhesively bonded to the rotor core. Unbalance compensation typically takes place via the ring, it being possible for the ring to be used for balancing by way of the removal of material. In further embodiments, flanges are provided at the axial ends of the rotor core for connecting the fillings made from plastic. Negative balancing can take place by way of removal of parts of the flanges. One possibility is a reduction in the wall thickness of the ring, for example by way of milling or grinding. Furthermore, punched-out portions or bores can be present on the ring. Simple production is made possible in this way.

Rotors according to the exemplary embodiments are typically produced by the plastic being injection-molded or cast. Here, the plastic for the rotor core and the fillings made from plastic between the magnets can be introduced at the same time. In typical embodiments, the rotor core with the fillings made from plastic between the magnets is configured in one piece. As a result, work operations can be reduced and production costs can be lowered. In further exemplary embodiments, the rotor core is of separate configuration or is prefabricated.

BRIEF DESCRIPTION OF THE DRAWINGS

In the following text, embodiments will be explained in greater detail using the appended drawings, in which.

DETAILED DESCRIPTION

Figure 1:
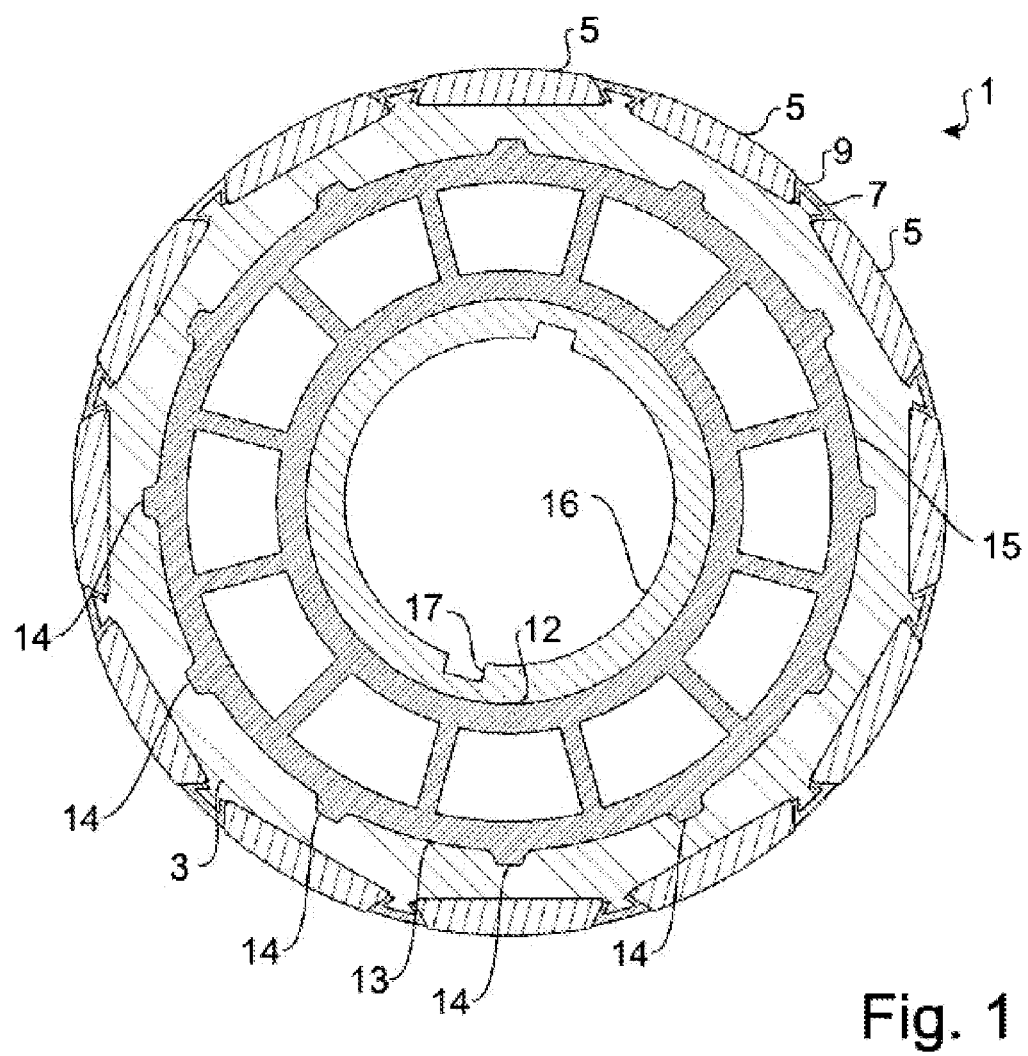
FIG. 1 shows one embodiment in a diagrammatically sectioned view.

FIG. 1 shows a typical embodiment of a rotor 1 which is configured as a permanent magnet rotor. The rotor 1 comprises a magnet support 3, on which magnets 5 are arranged. The magnets 5 are arranged on the magnet support 3 in each case between shaped-out moldings 7. The shaped-out moldings 7 are configured in one piece with the magnet support 3 or are connected permanently to the latter, for example welded or adhesively bonded. Plastic 9 is arranged in each case between the magnets 5 and the shaped-out moldings 7, which plastic 9 encloses the shaped-out moldings 7 completely and bears with an accurate fit both against the shaped-out moldings 7 and against part faces of the magnets 5. The plastic 9 therefore forms fillings between the magnets 5.

Figure 3:
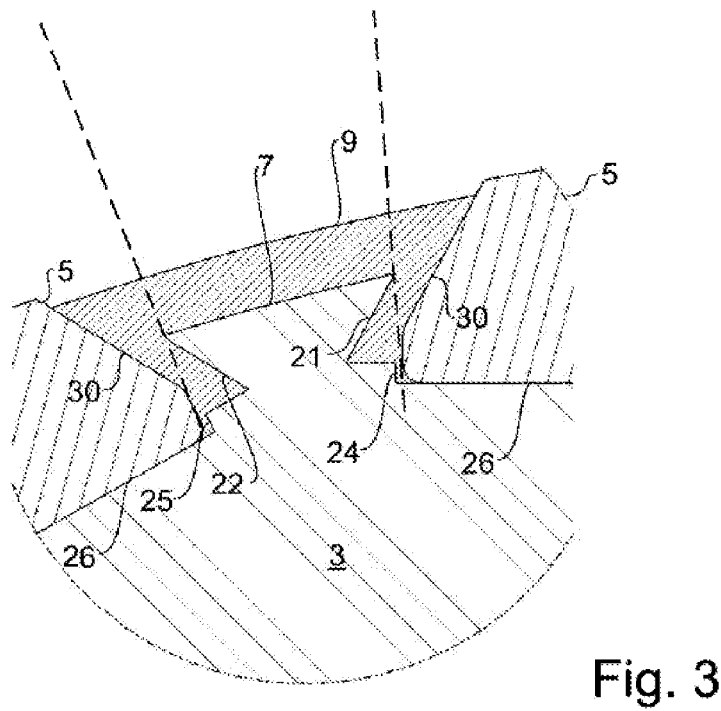
FIG. 3 shows a detail of the embodiment of FIG. 1.
Figure 4:
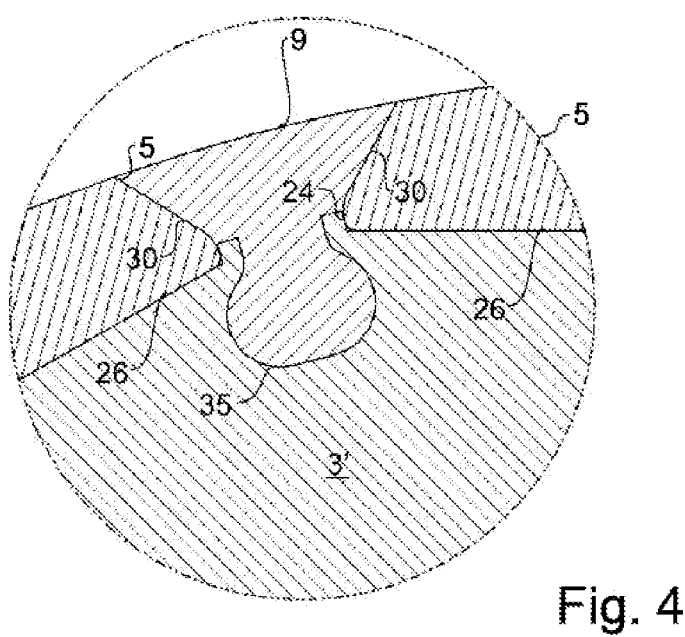
FIG. 4 shows a detail of a further embodiment.

Details in conjunction with the shaped-out moldings 7, the fillings made from plastic 9 and the magnets 5 are shown in FIG. 3, FIG. 4 showing an alternative design possibility of this region, moreover.

The rotor 1 is configured as a permanent magnet rotor, the magnets 5 being configured as permanent magnets. The drive of the rotor 1 takes place by way of a magnetic field which is generated by a stator (not shown).

The embodiment of FIG. 1 is produced by the magnets 5 being placed onto the magnet support 3. The magnets 5 are placed into the provided regions between the shaped-out moldings 7 in the radial direction radially from the outside. Subsequently, the plastic 9 is injection-molded in an injection-molding process. In embodiments, the individual sections of the fillings with the plastic 9 can also cover the magnets 5 at least partially. In typical exemplary embodiments, layers are preferred, the thickness of which is at most 10% or at most 5% of the thickness of the magnet. Furthermore, the individual sections of the plastic 9 can be connected at the axial ends via a disk or a ring, with the result that an injection-molding process or a casting process is facilitated.

The rotor 1 of the embodiment of FIG. 1 comprises a rotor core 15 which is likewise produced from plastic. The rotor core 15 is seated on a hollow shaft 16 with grooves 17. The rotor core comprises an inner circumferential face 12 and an outer circumferential face 13. Profilings 14 are arranged on the outer circumferential face 13. The profilings serve to secure against rotation of the components with respect to one another.

In typical exemplary embodiments and the exemplary embodiment of FIG. 1, profilings are configured as elevations. In further exemplary embodiments, in addition or exclusively, profilings are arranged on at least one circumferential face in the form of recesses. Profilings are usually oriented in the longitudinal direction, but can also be oriented in the circumferential direction or obliquely in embodiments.

In the following description of the further figures, reference is made to the description of the embodiment of FIG. 1, identical reference numerals being used for identical or similar parts. In the figures, not all identical parts are provided in each case with a reference sign, in order to improve the clarity. This applies, for example, to the magnets or the shaped-out moldings.

Figure 2:
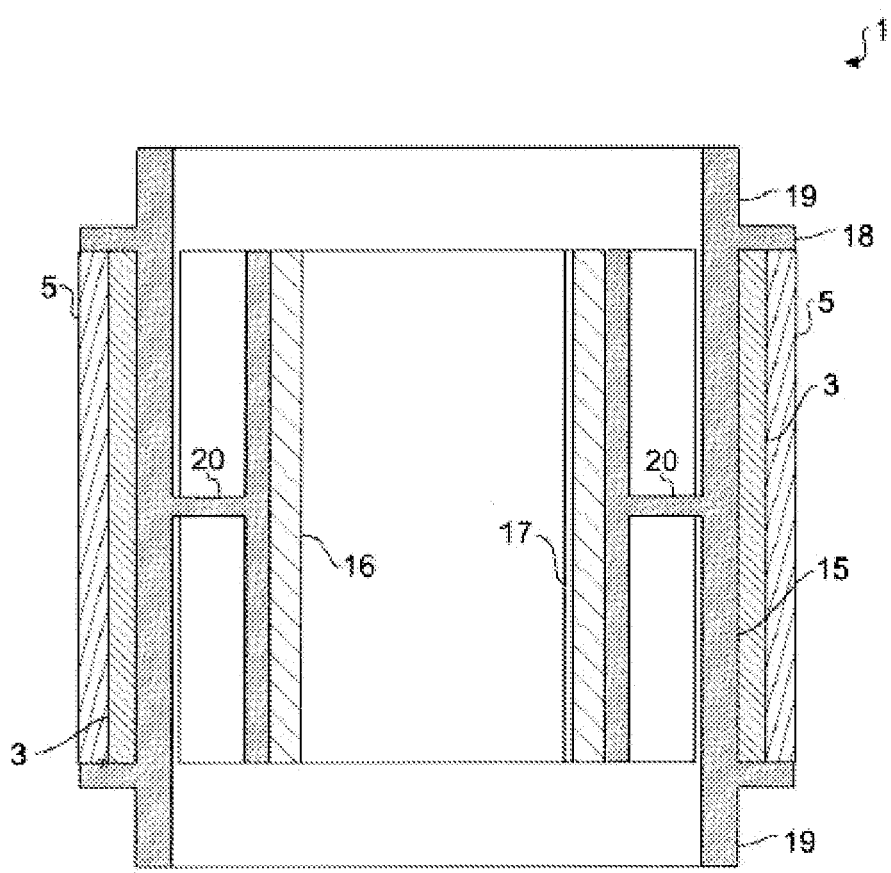
FIG. 2 shows the embodiment of FIG. 1, diagrammatically in cross section.

FIG. 2 shows the rotor core of FIG. 1, diagrammatically in cross section. At its axial ends, the rotor core comprises in each case flanges 18 which are configured in one piece with the rotor core 15. The fillings made from plastic 9 (see FIG. 1) are connected to one another via the flanges 18. Furthermore, axially projecting rings 19 are provided. Moreover, for weight reduction, the rotor core 15 has recesses, by way of which a spoke structure of the rotor core (see also FIG. 1) is produced. Webs 20 are provided in order to stabilize the rotor core.

The same plastic as for the fillings made from plastic between the magnets is typically used for the rotor core. Furthermore, it is possible, in embodiments, to provide a disk, a ring or a flange at at least one of the axial ends of the rotor core, via which disk, ring or flange the rotor core is connected to the fillings between the magnets, with the result that the rotor core can be injection-molded together with the fillings in a common injection-molding operation. Subsequent removal of a ring of this type is possible; furthermore, it is possible to cast or to injection-mold both the fillings and the rotor core in corresponding molds, spatially separated from one another but in one operation. Negative balancing is also possible by way of the removal of regions of the ring or the flange.

FIG. 3 shows details of the embodiment of FIG. 1, in particular details of the fastening of the magnets. FIG. 3 shows merely one of the shaped-out moldings 7. In cross section, the shaped-out molding 7 has a dovetail shape. Two undercuts 21 and 22 exist which necessitate the dovetail shape. Furthermore, in each case shoulders 24 and 25 are shown on both sides next to the shaped-out molding 7. The shoulders 24 and 25 delimit in each case depressions 26, in which magnets 5 are accommodated. The shoulders 24 and 25 at the edge of the depressions 26, into which the magnets can be inserted, additionally stabilize the magnets, in particular also during the production process before the plastic is injection-molded or hardened. The depressions 26 are configured so as to achieve a further material reduction and therefore weight saving. In addition, recesses can be provided in the region of the depressions. In typical embodiments, there is increasingly conductive material in the region of the shoulders 24 and 25, in order to achieve an improved magnetic flux. In contrast, from the viewpoint of the magnetic flux, it would be possible to completely omit material in the region of the depressions away from the shoulders, in order to save weight.

The magnets 5 have partially curved boundary faces in cross section. Inclined side faces 30 are provided on the sides which are oriented in each case toward the shaped-out moldings 7. In magnets of typical embodiments, the inclination of side faces which are oriented in the direction of the shaped-out moldings 7 corresponds at least substantially to the angle of the flanks of the shaped-out moldings. In this way, an at least substantially uniform spacing between the magnets and the shaped-out moldings is achieved, with the result that filling with plastic is possible in a reliable manner.

The magnets 5 have a width, such that they can be inserted radially between the shaped-out moldings 7. The magnets 5 do not have to be pushed in the axial direction. The plastic 9 is cast or injection-molded only after insertion of the magnets 5.

In preferred embodiments, the side walls are inclined in the circumferential direction, with the result that the magnets taper radially to the outside. In this way, the plastic between the magnets and the shaped-out moldings is subjected substantially to a compressive load.

FIG. 4 shows a detail of a further embodiment. With regard to the parts which are not shown in FIG. 4 or with regard to the description of parts which are shown in FIG. 4 but are not described in the following text, reference is made to the descriptions with respect to the embodiments of the other figures. In general, it is to be assumed in the sectional drawings of this application that the sections which are shown are constant over a finite portion of the respective rotors. For instance, both the indentations of embodiments and shaped-out moldings of embodiments are typically unchanged or rail-shaped in the axial direction. In further embodiments, indentations or shaped-out moldings can also be interrupted.

The magnets 5 of the embodiment of FIG. 4 likewise have inclined side walls 30. The inclined side walls 30 make a positively locking connection with the plastic possible.

Embodiments have magnets with inclined side faces, the inclination of the side faces with respect to the radial direction typically being at least 10°, in further typical exemplary embodiments at least 20° or at least 30°. The inclinations are typically at most 70° or at most 60° or at most 50° with respect to the radial direction. In this way, the magnets are held reliably on the magnet support.

In the embodiment of FIG. 4, a magnet support 3' of a further embodiment of a rotor has an undercut indentation 35 which is filled with plastic in an injection-molding process or in a normal-force casting process, also called encapsulating herein.

The magnets 5 are fixed in their position during filling of the indentation 35 and the intermediate space between the magnets 5 with the plastic 9. Corresponding features and advantages of the other embodiments in the case of identical or similar features apply analogously to the embodiment of FIG. 4. For instance, shoulders 24 and 25 and depressions 26 for the magnets are likewise provided in the embodiment of FIG. 4, in order to further improve the positional securing of the magnets 5. The embodiment of FIG. 4 can also be configured with or without a rotor core made from plastic.

Figure 5:
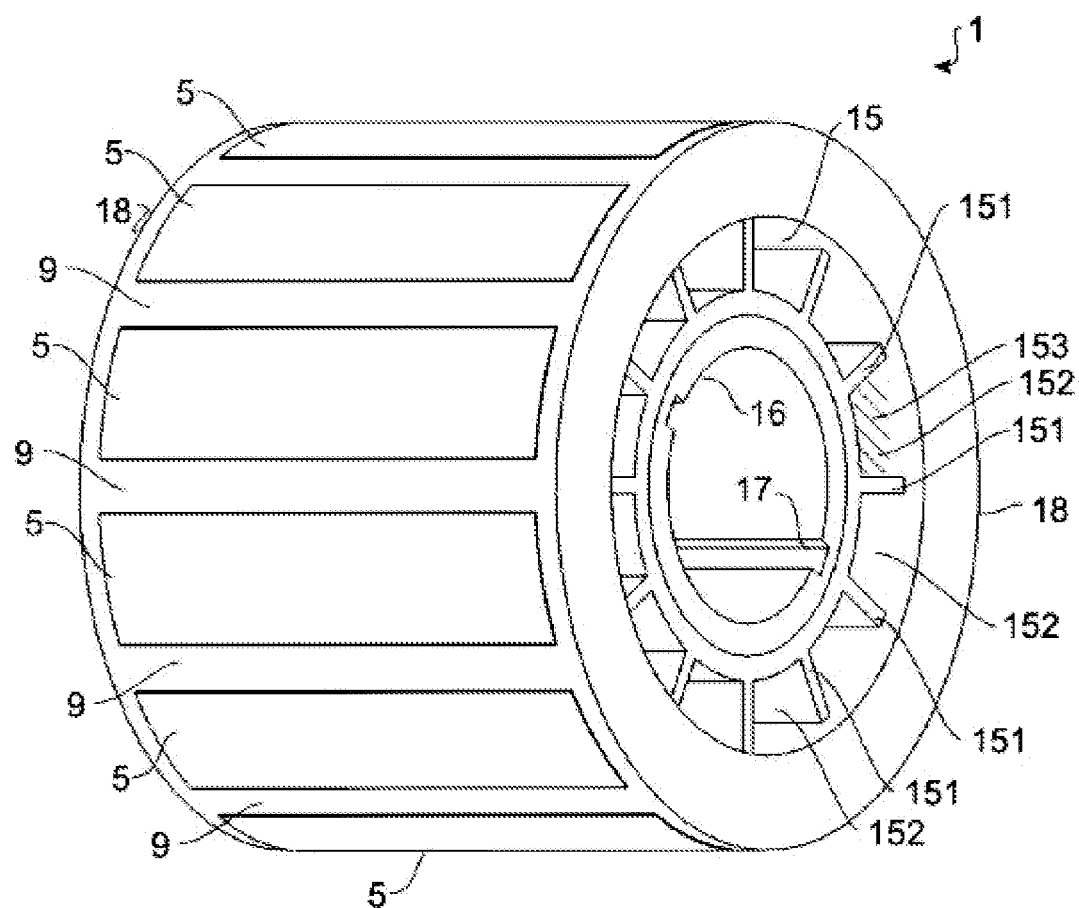
FIG. 5 shows an embodiment of a rotor, diagrammatically in a perspective view.

FIG. 5 shows an embodiment of a rotor 1, diagrammatically in a perspective view. The rotor 1 of FIG. 5 corresponds to the embodiment of FIG. 1 in the cross section which is shown in FIG. 1. In comparison with the cross section in the axial direction or longitudinal section which is shown in FIG. 2, the embodiment of FIG. 5 does not have any rings at the axial ends. Reference is therefore made to the description of FIG. 1 and FIG. 2 for many of the features and reference signs.

The spoke structure of the rotor 1 can be seen clearly in FIG. 5. Axial openings 152 are arranged between the spokes 151 of the rotor core 15. The flanges 18 terminate the rotor 1 axially and connect the fillings made from plastic 9. As in typical embodiments, the rotor core 15 is connected in one piece to the fillings made from plastic 9 via the flanges 18. This makes simultaneous production during casting or injection-molding possible, and also the use of a uniform plastic.

In the rotor 1 of FIG. 5, an epoxy resin 153 is injection-molded into one of the axial openings 152, with the result that an unbalance is produced. An unbalance of the rotor 1 or of other parts on the shaft 16 can be compensated for by this artificially produced unbalance.

All embodiments can be produced by way of different production processes; for example, the plastic can be cast or injection-molded, simultaneous injection-molding or casting both of a rotor core and of the fillings between the magnets being possible.

The invention is not restricted to the embodiments which are described. Further features of typical embodiments are specified in the claims.

The invention claimed is:

1. A rotor for an electric machine, comprising:
   a magnet support;
   a plurality of magnets which are arranged on the magnet support; and
   a rotor core which is arranged between a shaft and the magnet support, the rotor core comprising plastic,
   wherein the rotor core comprises an inner circumferential face and an outer circumferential face;
   wherein the outer circumferential face of the rotor core comprises profilings;
   wherein the profilings comprise elevations; and
   wherein the profilings on the outer circumferential face are oriented in a longitudinal direction with respect to the rotor.

2. The rotor according to claim 1, wherein the rotor core has a thickness in the radial direction of at least 10% and of at most 50% of the radius of the rotor.

3. The rotor according to claim 1, wherein the plurality of magnets are arranged individually on the magnet support.

4. The rotor according to claim 1, wherein the plurality of magnets are configured as permanent magnets.

5. The rotor according to claim 1, wherein the magnet support comprises a magnetically conductive material.

6. The rotor according to claim 1, wherein the rotor core comprises profilings on its inner circumferential face, wherein the profilings on the inner circumferential face comprise at least one of elevations and recesses.

7. The rotor according to claim 1, wherein the rotor core comprises openings which are oriented in the axial direction.

8. The rotor according to claim 1, wherein the rotor core comprises radial spokes.

9. The rotor according to claim 1, wherein the rotor core has an unbalance.

10. The rotor according to claim 1, wherein the rotor core comprises an axially projecting ring.

11. The rotor according to claim 1, wherein plastic is arranged between the individual magnets of the plurality of magnets.

12. The rotor according to claim 11, wherein a peripheral surface of the plurality of magnets is at least partially free from plastic.

13. The rotor according to claim 1, wherein the profilings comprise recesses.

14. A rotor for an electric machine, comprising:
   a magnet support;
   a plurality of magnets which are arranged on the magnet support; and
   a rotor core which is arranged between a shaft and the magnet support, the rotor core comprising plastic,
   wherein the rotor core comprises profilings on its outer circumferential face;

wherein the profilings comprise elevations and recesses; and wherein the profilings on the outer circumferential face are oriented in at least two of the following directions: longitudinal direction, circumferential direction, and obliquely with respect to the rotor.

* * * * *